(12) United States Patent  
Yager et al.

(10) Patent No.: US 12,515,216 B2  
(45) Date of Patent: Jan. 6, 2026

(54) PATHOGEN FILTRATION APPARATUS, SYSTEM, AND METHOD

(71) Applicant: University of Washington, Seattle, WA (US)

(72) Inventors: Paul Yager, Seattle, WA (US); Steven Bennett, Seattle, WA (US); Sujatha Kumar, Seattle, WA (US); Kamal Girish Shah, Seattle, WA (US); Erin K. Heiniger, Seattle, WA (US)

(73) Assignee: University of Washington, Seattle, WA (US)

( * ) Notice: Subject to any disclaimer, the term of this patent is extended or adjusted under 35 U.S.C. 154(b) by 915 days.

(21) Appl. No.: 17/761,138

(22) PCT Filed: Oct. 1, 2020

(86) PCT No.: PCT/US2020/053761  
§ 371 (c)(1),  
(2) Date: Mar. 16, 2022

(87) PCT Pub. No.: WO2021/067573  
PCT Pub. Date: Apr. 8, 2021

(65) Prior Publication Data  
US 2022/0371006 A1    Nov. 24, 2022

Related U.S. Application Data

(60) Provisional application No. 62/910,747, filed on Oct. 4, 2019.

(51) Int. Cl.  
*B01L 3/00* (2006.01)  
*G01N 1/14* (2006.01)  
*G01N 1/40* (2006.01)

(52) U.S. Cl.  
CPC .......... *B01L 3/5023* (2013.01); *B01L 3/5635* (2013.01); *G01N 1/14* (2013.01);  
(Continued)

(58) Field of Classification Search  
CPC ................ B01L 3/5023; B01L 3/5635; B01L 2300/042; B01L 2300/0681; G01N 1/14; G01N 2001/4088  
See application file for complete search history.

(56) References Cited

U.S. PATENT DOCUMENTS 7,368,337 B2    5/2008  Dongbu  
7,377,027 B2    5/2008  Mayer  
(Continued)

FOREIGN PATENT DOCUMENTS

WO    2019/213096 A1    11/2019

*Primary Examiner* — Jill A Warden  
*Assistant Examiner* — Alex Ramirez  
(74) *Attorney, Agent, or Firm* — Christensen O'Connor Johnson Kindness PLLC

(57) ABSTRACT

An apparatus, system, and method for filtering and assaying a fluid sample are described. In an embodiment, the apparatus includes a filtration unit comprising: a filter bracket shaped to removably couple with a fluid sample cup and a vacuum container; and a filter housing cooperatively couplable to the filter bracket and comprising a filter configured to filter fluid passing through the filter bracket; and an assay device shaped to cooperatively couple with the filter housing and comprising a porous matrix positioned to be in fluidic communication with the filter when the filter housing is cooperatively coupled with the assay device.

32 Claims, 17 Drawing Sheets

(52) U.S. Cl.
CPC . *B01L 2300/042* (2013.01); *B01L 2300/0681* (2013.01); *G01N 2001/4088* (2013.01)

(56) References Cited

U.S. PATENT DOCUMENTS

| | | |
|---|---|---|
| 9,057,702 B2 | 6/2015 | Ozcan et al. |
| 9,213,042 B2 | 12/2015 | Oldham et al. |
| 9,931,636 B2 | 4/2018 | Ching et al. |
| 2002/0094533 A1 | 7/2002 | Hess et al. |
| 2003/0088963 A1* | 5/2003 | Mayer .............. B01L 3/502 29/709 |
| 2005/0106750 A1* | 5/2005 | Tung .............. A61B 10/007 422/562 |
| 2011/0201099 A1 | 8/2011 | Anderson et al. |
| 2014/0271252 A1 | 9/2014 | Vines et al. |

* cited by examiner

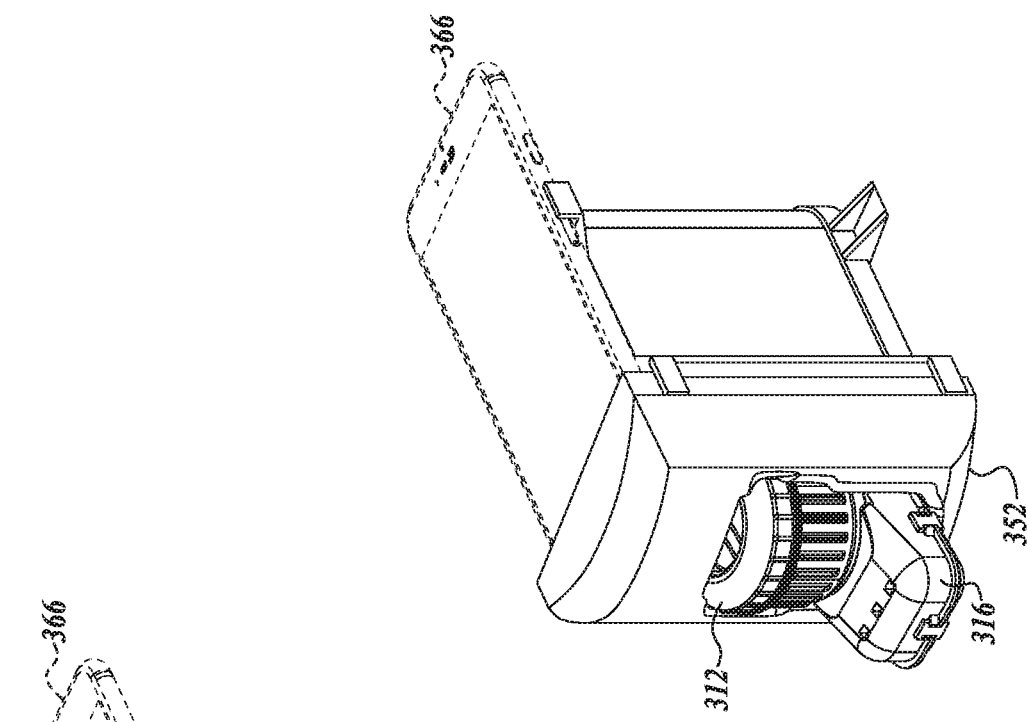
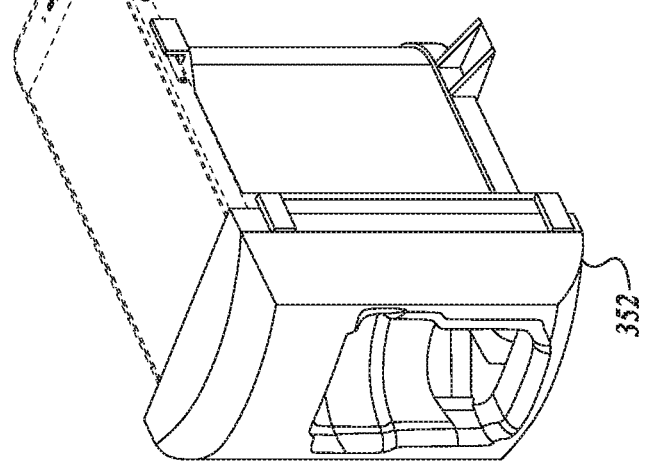
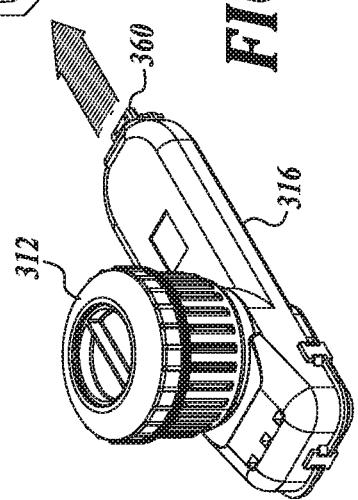
FIG. 3F-1
FIG. 3F-2

PATHOGEN FILTRATION APPARATUS, SYSTEM, AND METHOD

CROSS-REFERENCE TO RELATED APPLICATION

This application claims the benefit of U.S. Provisional Patent Application No. 62/910,747 filed Oct. 4, 2019, the content of which is incorporated herein by reference in its entirety.

STATEMENT OF GOVERNMENT LICENSE RIGHTS

This invention was made with government support under Grant No. W911QY-18-P0312, awarded by the U.S. Army. The government has certain rights in the invention.

BACKGROUND

Many tests of liquid biological samples, such as urine samples, currently include a step for centrifuging and/or filtering the liquid biological sample to concentrate particulate components of the liquid biological sample. Such centrifugation and/or filtration steps can be time consuming and require specialized laboratory equipment. Further, such centrifugation and/or filtration are frequently performed by professional laboratory technicians to avoid or mitigate the risk of sample contamination and contamination by those performing the test.

Accordingly, there is presently a need for an apparatus, system, and method for processing fluid biological samples that concentrates and/or filters such samples in a way that avoids or reduces the use of expensive, complicated laboratory equipment and mitigates risks associated with contamination of and/or with the fluid biological sample. Further, there is a need for such an apparatus, system, and method that can be used in a point-of-care setting and by those who are not professional laboratory technicians.

SUMMARY

In certain aspects, the present disclosure provides an apparatus, system, and method for filtering and analyzing fluid biological samples to address these and related needs.

Accordingly, in an aspect, the present disclosure provides a fluidic apparatus for filtering and assaying a fluid sample. In an embodiment, the apparatus comprises a filtration unit comprising: a filter bracket shaped to removably couple with a fluid sample cup and a vacuum container; and a filter housing cooperatively couplable to the filter bracket and comprising a filter configured to filter fluid passing through the filter bracket; and an assay device shaped to cooperatively couple with the filter housing and comprising a porous matrix positioned to be in fluidic communication with the filter when the filter housing is cooperatively coupled with the assay device.

In another aspect, the present disclosure provides a fluidic system for filtering and assaying a fluid sample. In an embodiment, the system comprises a fluid sample cup shaped to carry a fluid sample; a filtration unit comprising: a filter bracket shaped to removably couple with the fluid sample cup and a vacuum container; and a filter housing cooperatively couplable to the filter bracket and comprising a filter configured to filter fluid passing through the filter bracket; and an assay device shaped to cooperatively couple with the filter housing and comprising a porous matrix positioned to be in fluidic communication with the filter when the filter housing is cooperatively coupled with the assay device.

In yet another aspect, the present disclosure provides a method of filtering a liquid sample. In an embodiment, the method comprises coupling a vacuum source to a filter bracket, thereby passing a liquid biological sample through a filter cooperatively coupled to the filter bracket; uncoupling the filter from the filter bracket; and coupling the filter to an assay device, thereby placing the filter in fluidic communication with a buffer of a buffer reservoir and a porous matrix of the assay device to flow a filtered portion of the liquid biological sample through the porous matrix.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3F schematically illustrates coupling the assay device of FIG. 3E to a detection stand, in accordance with an embodiment of the present disclosure;

DETAILED DESCRIPTION

Embodiments of a fluidic apparatus, fluidic system, and method for filtering a fluid sample are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The detailed description set forth below in connection with the appended drawings, where like numerals reference like elements, is intended as a description of various embodiments of the disclosed subject matter and is not intended to represent the only embodiments. The embodiments described in this disclosure are provided merely as examples or illustrations and should not be construed as preferred or advantageous over other embodiments. The illustrative examples provided herein are not intended to be exhaustive or to limit the claimed subject matter to the exact forms disclosed.

Apparatuses

Figure 1A:
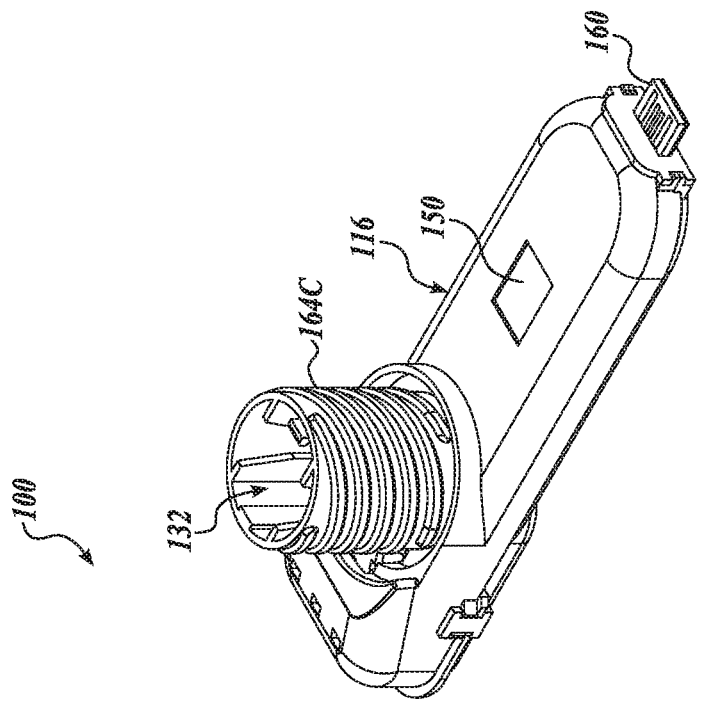
FIG. 1A is a perspective illustration of a fluidic apparatus, according to an embodiment of the present disclosure.
Figure 1A:
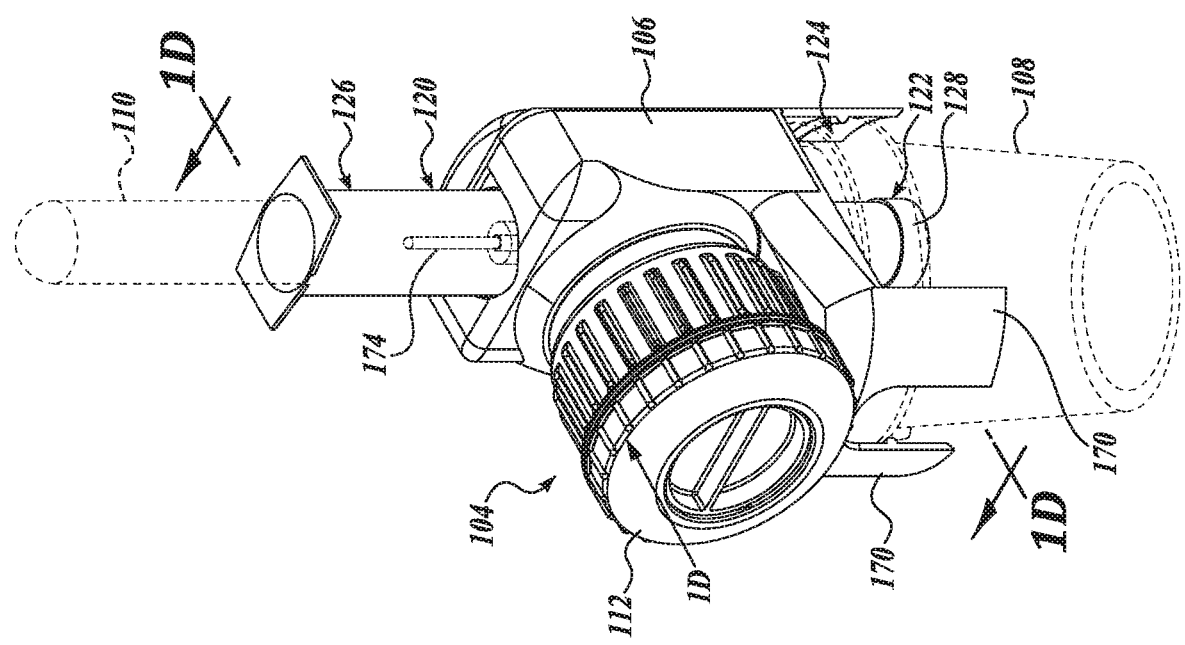
Figure 1B:
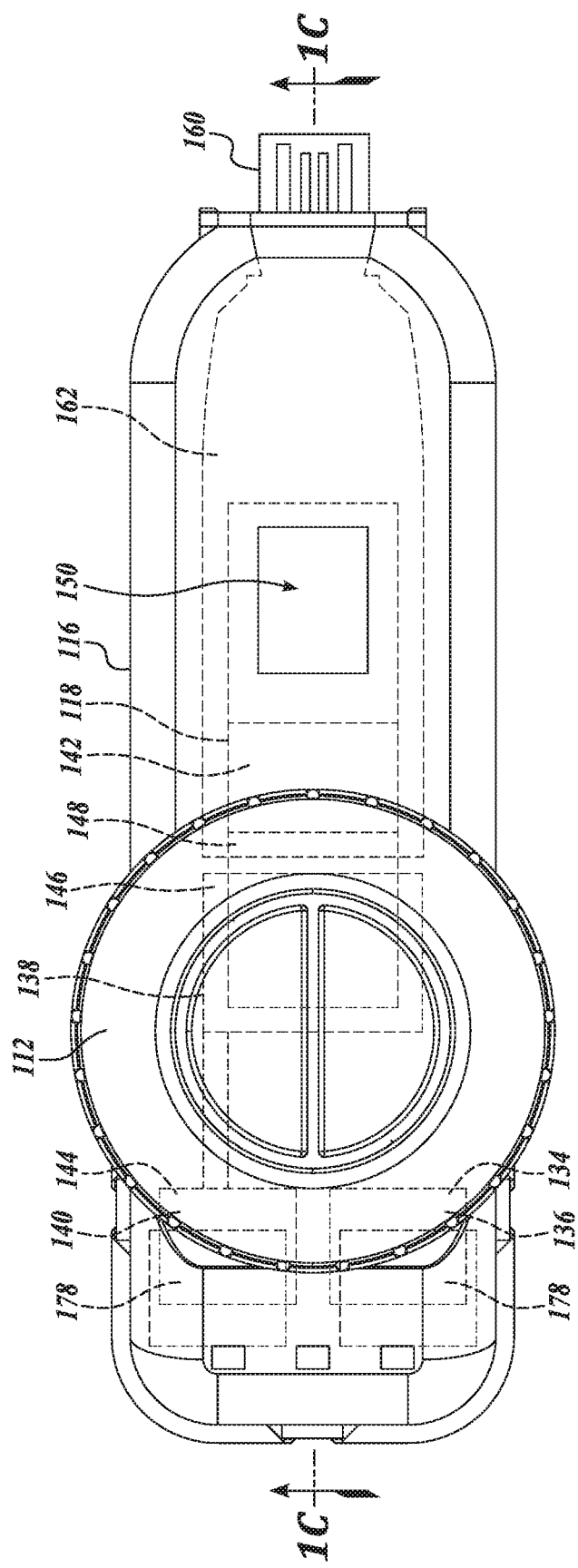
FIG. 1B is a top-down plan view of the fluidic device of FIG. 1A, in accordance with an embodiment of the disclosure.
Figure 1C:
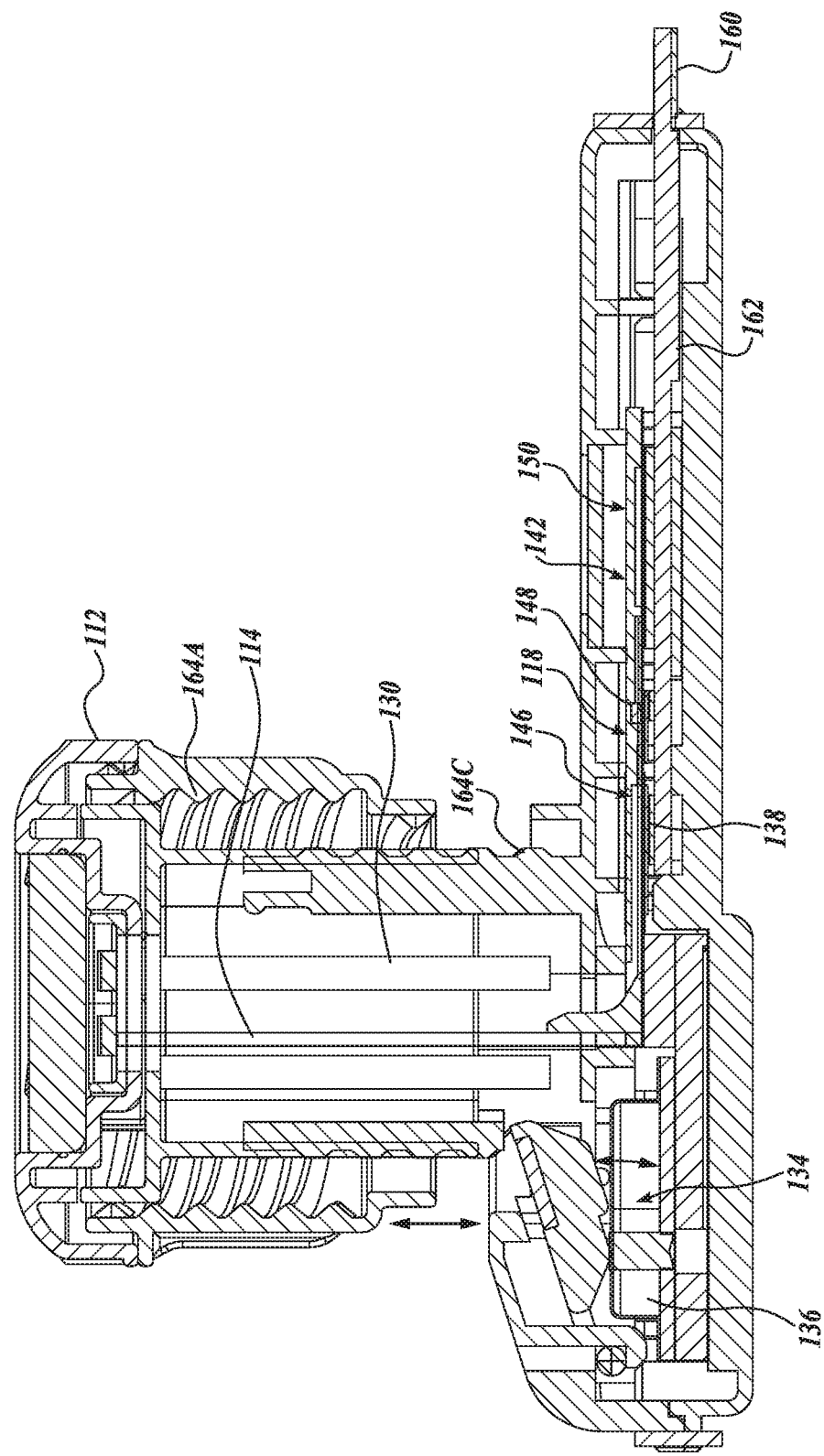
FIG. 1C is a cross-section view of a filter housing coupled to an assay device of the fluidic apparatus of FIG. 1A, in accordance with an embodiment of the disclosure.
Figure 1D:
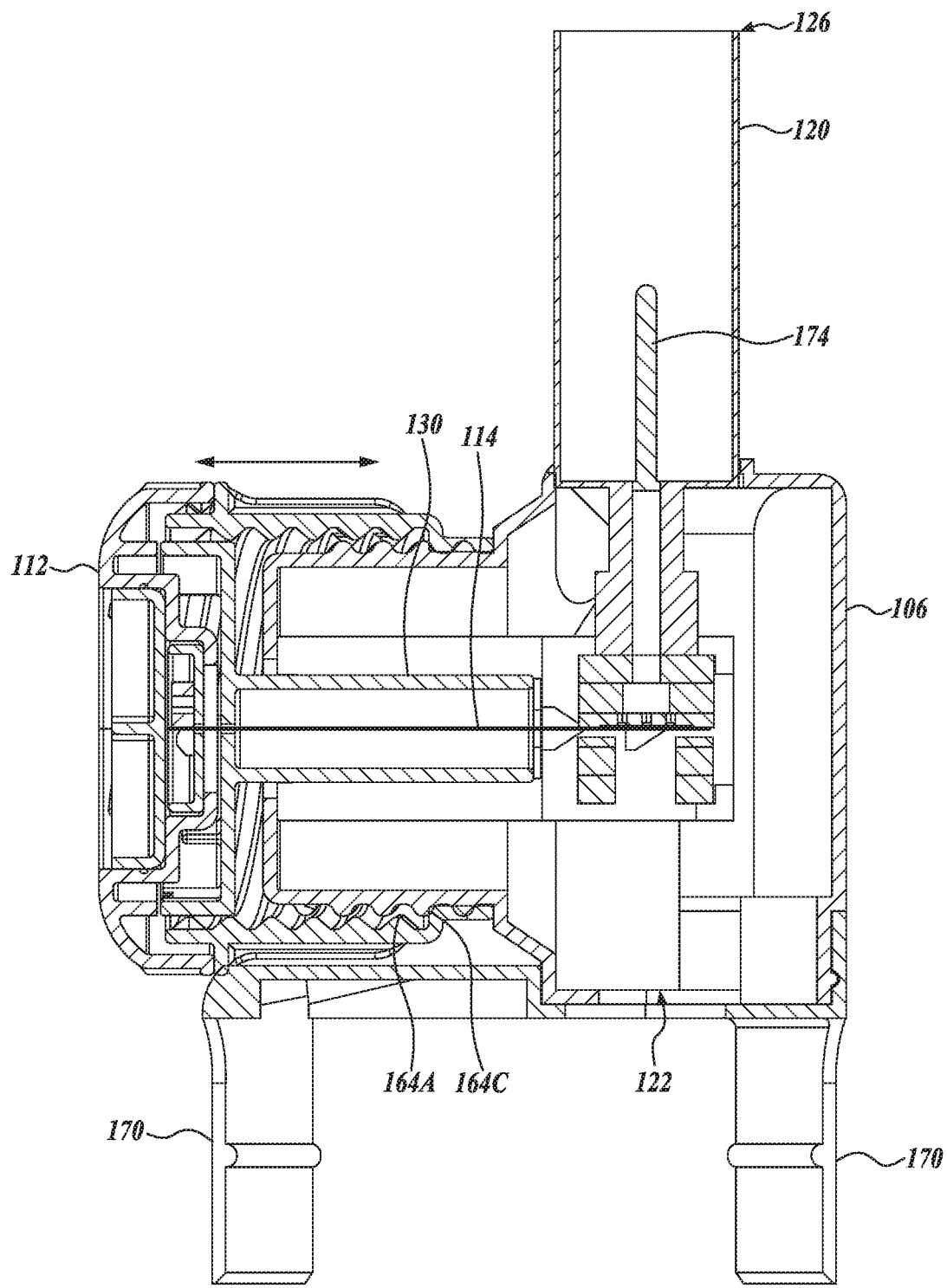
FIG. 1D is cross-section view of a filtration unit of the fluidic apparatus of FIG. 1A, in accordance with an embodiment of the present disclosure.

In an aspect, the present disclosure provides a fluidic apparatus for filtering and assaying a fluid sample. In that regard, attention is directed to FIGS. 1A-1D in which a fluidic apparatus 100, in accordance with an embodiment of the present disclosure, is illustrated. FIG. 1A is a perspective illustration of a fluidic apparatus 100. FIG. 1B is top-down plan view of the fluidic apparatus 100. FIG. 1C is a cross-section view of a filter housing 112 coupled to an assay device 116 of the fluidic apparatus 100. FIG. 1D is a cross-section view of a filtration unit 104 of the fluidic apparatus 100.

As shown, the fluidic apparatus 100 includes a filtration unit 104 and an assay device 116. The filtration unit 104 includes a filter bracket 106 shaped to removably couple with a fluid sample cup 108 and a vacuum container 110. In this regard, the filtration unit 104 may be coupled to a fluid sample cup 108, such as a urine sample cup 108 containing a urine sample. In the illustrated embodiment, the filter bracket 106 is shown to include several filter bracket flanges 170 shaped to partially encircle a cap 124 of the fluid sample cup 108, such as with ridges disposed on an interior surface of the filter bracket flanges 170.

Figure 2:
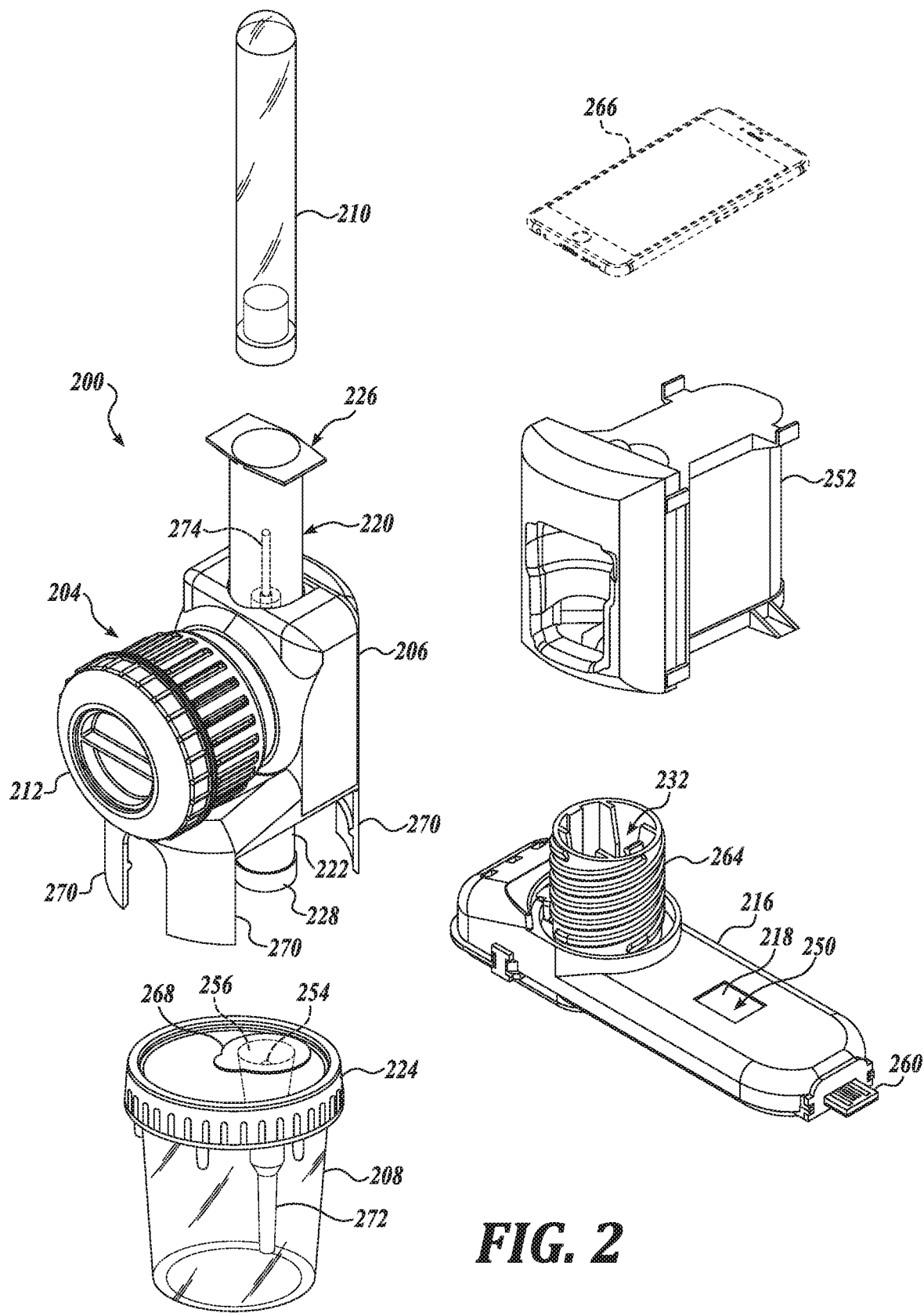
FIG. 2 is a perspective illustration of a fluidic system, in accordance with an embodiment of the present disclosure.

The filter bracket 106 is also shown to define a filtration tube 120 for passing a fluid sample through a filter 114. The filtration tube 120 comprises a sampling end 122 shaped and positioned couple with the cap 124 of the fluid sample cup 108 and configured to draw a fluid sample therefrom. As shown, the sampling end 122 of the filtration tube 120 comprises a vacuum seal 128 shaped and positioned to be broken by the cap 124 of the fluid sample cup 108 when the filter bracket 106 is coupled to the fluid sample cup 108. As discussed further herein with respect to the method 300 of FIGS. 3A-3F, when the filter bracket 106 is coupled to the fluid sample cup 108, the vacuum seal 128 broken by the cap 124, such as by a puncturing structure of the cap 124 (not shown, see for example FIG. 2), thereby placing the filtration tube 120 in fluidic communication with contents of the fluid sample cup 108.

The filtration tube 120 is also shown to define a suction end 126 positioned opposite the sampling end 122 and shaped to couple with the vacuum container 110. As also discussed further herein with respect to the method 300 of FIGS. 3A-3F, when the vacuum source 110, such as a vacutainer 110, is coupled to the suction end 126, the vacuum source 110 draws the fluid sample through the filtration tube 120 from the sampling end 122 to the suction end 126. In the illustrated embodiment, the suction end 126 is shown to define a protrusion 174 shaped and positioned to puncture a vacutainer or other vacuum source 110 disposed in the suction end 126 to place the filtration tube 120 in fluidic communication with the vacuum source 110.

As shown, the filtration unit 104 further includes a filter housing 112 cooperatively couplable to the filter bracket 106. The filter housing 112 includes a filter 114 configured to filter fluid passing through the filter bracket 106, such as a fluid sample passing from a fluid sample cup 108 through the filtration tube 120 and into a vacuum source 110, such as a vacutainer. As shown in FIGS. 1C and 1D, the filter 114 is recessed within a filter sheath 130 of the filter housing 112. In this regard, the filter 114 is shielded from contamination, such as between when the filter housing 112 is uncoupled from the filter bracket 106 and when the filter housing 112 is coupled to the assay device 116. Accordingly, a user of the fluidic apparatus 100 is less likely to touch a filter 114 that has been used to filter a fluid sample, and, thereby, less likely to contaminate themselves with a potentially infectious or otherwise harmful sample. Correspondingly, a user is also less likely to contaminate a filtered portion of a fluid sample disposed on the filter 114.

Figure 4:
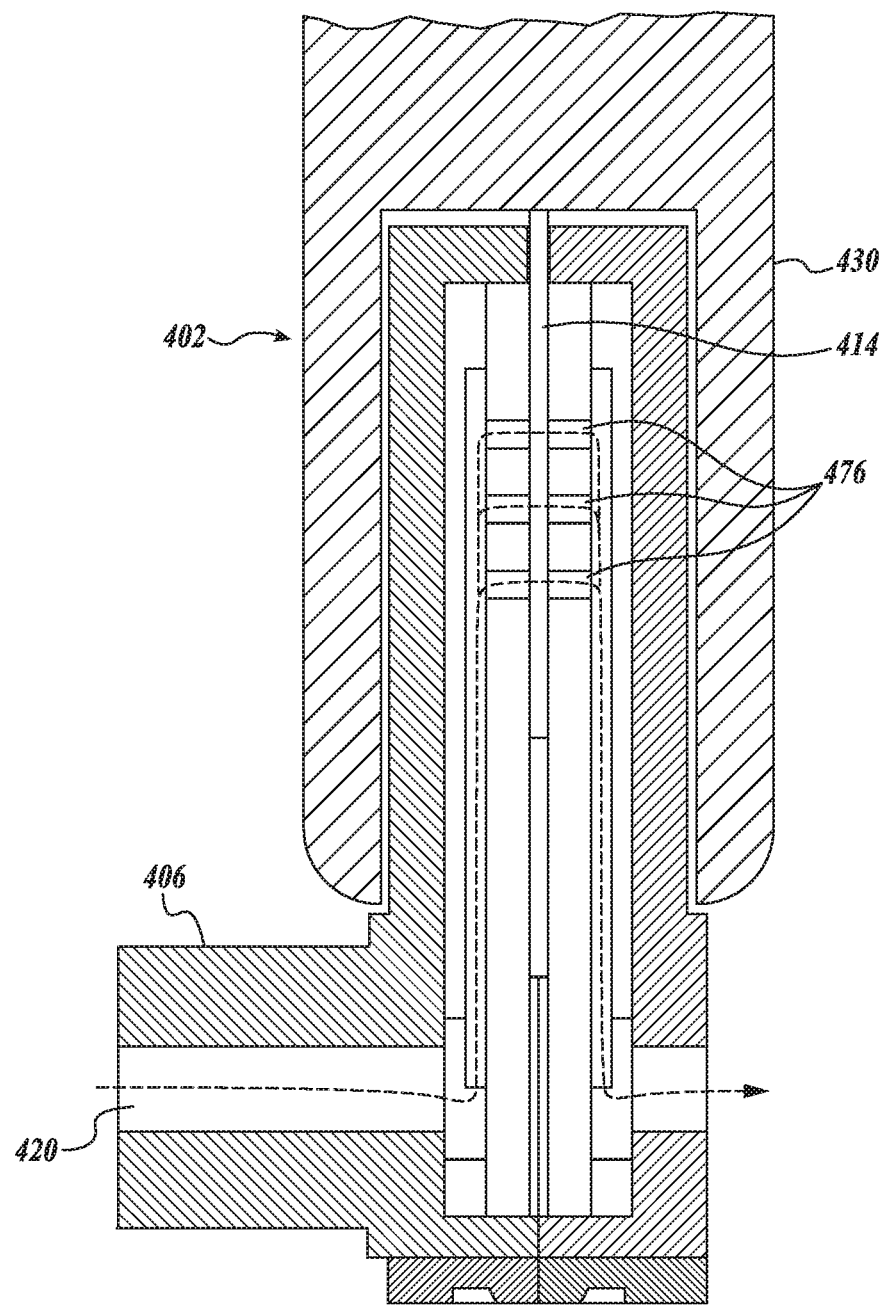
FIG. 4 schematically illustrates a fluid flowing through a filtration tube and a filter of a fluidic apparatus, in accordance with an embodiment of the present disclosure.

An example of a filter 414 of a filter housing 412 received by a filter bracket 406, in accordance with an embodiment of the disclosure, is shown in FIG. 4. As shown, fluid passes through an upstream portion of the filtration tube 420 and through a number of apertures 476 and the filter 414 and into a downstream portion of the filtration tube 420. In this regard, fluid passing through the filtration tube 420 is filtered by the filter 414. Such a filtered sample can include particulates from the fluid sample, such as particulates including cells having a concentration in the filter greater than a particulate concentration greater than in an unfiltered fluid sample. In an embodiment, filtration illustrated in FIG. 4 is an example of filtration of a fluid sample through the filtration unit 104 of fluidic apparatus 100.

Returning to FIGS. 1A-1D and as noted above, the filter bracket 106 and the filter housing 112 are cooperatively couplable. In this regard, the filter bracket 106 and the filter housing 112 may be coupled, such as with threads 164A and 164B respectively disposed on the filter bracket 106 and the filter housing 112, to filter a fluid sample. The filter bracket 106 and filter housing 112 are also configured to be uncoupled, such as by rotating the filter housing 112 relative to the filter bracket 106, as discussed further herein with respect to FIG. 3D.

As above, the fluidic apparatus 100 also includes an assay device 116. The assay device 116 is shaped to cooperatively couple with the filter housing 112, such as through threads 164C. The assay device 116 is shown the further include a sample slot 132 shaped to receive the filter sheath 130. In this regard, the sample slot 132 is shaped and positioned such that when the filter housing 112 is coupled to the assay device 116, the filter sheath 130 and filter 114 are received and encased by the assay device 116.

As shown in FIGS. 1B and 1C, the assay device 116 includes a porous matrix 118 positioned to be in fluidic communication with the filter 114 when the filter housing 112 is cooperatively coupled with the assay device 116. As used herein, "porous matrix" or "porous membrane" refer to a porous membrane (e.g., a wick, pathway, leg, pad, delivery channel, etc.) through which fluid can travel by capillary action, such as paper, nitrocellulose, nylon, glass fiber, and the like. Unless the context clearly requires otherwise, a porous matrix can be two-dimensional or three-dimensional (when considering its height in addition to its length and width). Additionally, a porous matrix can be a single layer or may comprise two or more membranous layers. Although in some embodiments a specific term may be used (e.g., "wick," "pathway," "leg," "pad," "delivery channel," etc.), it should be understood that use of a different porous element is also within the scope of the present technology.

In the illustrated embodiment, the assay device 116 further comprises a buffer reservoir 134 carrying a buffer 136. As shown in FIG. 1C, as the filter housing 112 is coupled to the assay device 116 by cooperatively coupling the threads 164A and 164C of the filter housing 112 and the assay device 116, the filter housing 112 lowers to rotate the pivot 178, thereby puncturing the buffer reservoir 134, shown here as a blister pack, to place the buffer 136 in fluidic communication with the filter 114 and the porous matrix 118. In this regard, the buffer 136 released from the buffer reservoir 134 flows the filtered fluid sample from the filter 114 onto the porous matrix 118 for further manipulation thereon.

While a pivot 178 and blister pack are illustrated, it will be understood that other structures, such as syringes depressed by the filter housing 112, are also within the scope of the present disclosure.

With the filter housing 112 cooperatively coupled with the assay device 116, the buffer 136 is in fluid communication with both the porous matrix 118 and the filter 114. In this regard, a filtered sample disposed in the filter 114, such as a filtered sample including one or more particulates from the sample, is dissolved and/or suspended in the buffer 136 and transported through the porous matrix 118.

In the illustrated embodiment, the fluidic apparatus 100 includes a heat source 138. The heat source 138 is configured to apply heat to a number of portions of the porous matrix 118, such as to assist with and/or activate reactions within the porous matrix 118. As shown, the heat source 138 includes a heat source 138 activated by contact with a saline solution 140 and configured to heat a portion of the porous matrix 118, such as a lysis portion 146 and/or an amplification portion 142 of the porous matrix 118. The assay device 116 is shown to further include a saline solution reservoir 144 carrying a saline solution 140 configured to place the saline solution 140 in fluidic communication with the heat source 138 when the filter housing 112 is cooperatively coupled with the assay device 116.

As above, the lysis portion 146 is in thermal communication with the heat source 138. In an embodiment, heating the lysis portion 146 is configured to deactivate enzymes, burst cells, and extract nucleic acids of the liquid biological sample in the lysis portion 146 of the porous matrix 118. In this regard, the filtered sample is processed for further analysis downstream of the lysis portion 146.

As shown, the lysis portion 146 of the porous matrix 118 is fluidically isolated from an amplification portion 142 by a phase-change valve 148. Such fluidic isolation allows for processing of the filtered sample in the lysis portion 146 under conditions, such as at elevated temperatures, that may not be suitable for nucleic acid amplification. In an embodiment, the heat source 138 is configured to melt the phase-change valve 148 disposed between the lysis portion 146 and the amplification portion 142 of the porous matrix 118 to place the lysis portion 146 and the amplification portion 142 in fluidic communication. In an embodiment, the phase-change valve 148 includes a wax, such as paraffin, configured to change from a solid to a liquid when a temperature of the phase-change material is over a phase-change temperature.

In an embodiment, the amplification portion 142 comprises amplification reagents configured to amplify a target nucleic acid in or thought to be in a sample filtered by the filter 114, such in the filtered sample processed in the lysis portion 146. In an embodiment, the amplification reagents include one or more enzymes for a nucleic acid amplification reaction, such as, for example, a polymerase, a reverse transcriptase, and the like. The amplification reagents can include, for example, one or more primers, buffer, dNTPs, and the like, suitable for performing a nucleic acid amplification reaction. In an embodiment, the amplification reagents are configured to perform an isothermal nucleic acid amplification reaction, such as isothermal strand displacement amplification reaction. In an embodiment, the amplification reagents are lyophilized or otherwise dried on the porous matrix 118 for resuspension or dissolution in the buffer 136.

As shown, the porous matrix 118 further comprises a detection portion 150 comprising detection reagents configured to detect a target nucleic acid in the porous matrix 118. In an embodiment, the detection portion 150 is configured to selectively bind and visualize nucleic acid molecules, such as target nucleic acid molecules. The detection portion 150 is shown disposed at a distal end of the porous matrix 118 downstream from the amplification portion 142 of the porous matrix 118. In this regard, the detection portion 150 is positioned to receive an amplified sample, such as an amplified sample comprising amplified target nucleic acid molecules, as the filtered sample wicks through the porous matrix 118. In an embodiment, the detection reagents include one or more of fluorescent antibodies, gold nanoparticles, fluorescent beads, detection enzymes (such as horseradish peroxidase), and the like. In an embodiment, the detection reagents are lyophilized or otherwise dried on the porous matrix 118.

The heat source 138 can be any heat source 138 configured to deliver a suitable amount of heat to the porous matrix 118. In an embodiment, the heat source 138 or a portion thereof is electrically powered. As shown, the assay device 116 includes an USB head 160 shaped to receive electrical power from an outside source, such as a detector stand discussed further herein with respect to FIG. 2 and FIG. 3F. In an embodiment, the assay device 116 further includes a printed circuit board 162 or other structure configured to receive power from the USB head 160 and deliver heat to the porous matrix 118, such as through electrical resistive heating, to choreograph various reactions and fluid flow on the porous matrix 118. In this regard, the printed circuit board 162 can be configured to heat the lysis portion 146 to process the filtered sample, melt the phase change valve 148, and heat the amplification portion 142 to amplify any target nucleic acid molecules in the filtered sample.

Systems

In another aspect, the present disclosure provides fluidic systems for filtering and assaying a fluid sample. In that regard, attention is directed to FIG. 2, in which a fluidic system 200, in accordance with an embodiment of the disclosure, is illustrated.

In the illustrated embodiment, the fluidic system 200 is shown to include a fluid sample cup 208 shaped to carry a fluid sample 202; a filtration unit 204; and an assay device 216. In an embodiment, the filtration unit 204 is an example of filtration unit 104 discussed further herein with respect to FIGS. 1A-1D. In an embodiment, the assay device 216 is an example of the assay device 116 discussed further herein with respect to FIGS. 1A-1C.

As shown, the filtration unit 204 includes a filter bracket 206 shaped to removably couple with the fluid sample cup 208 and a vacuum container 208. In the illustrated embodiment, the filter bracket 206 includes flanges 270 shaped to partially encircle and couple with a cap 224 of the sample cup 208, thereby removably coupling the filter bracket 206 to the sample cup 208 such that a fluid sample 202 can be removed from the sample cup 208 and into the filtration unit 204.

The filter bracket 206 is shown to define a filtration tube 220 comprising a sampling end 222 shaped and positioned couple with a cap 224 of the fluid sample cup 208; and a suction end 226 positioned opposite the sampling end 222 and shaped to couple with the vacuum container 208. In the illustrated embodiment, the sampling end 222 comprises a vacuum seal 228. Correspondingly, the cap 224 defines a puncturing structure 254 disposed in a recess 256 of the cap 224 shaped to puncture the vacuum seal 228 when the filter bracket 206 is coupled to the cap 224. As shown, the recess 256 is covered by seal 268 to isolate the recess 256 prior to use. When the filter bracket 206 is coupled to the sample cup 208, the puncturing structure 254 breaks the vacuum seal 228 to place an interior portion of the sample cup 208 in fluid communication with the filtration tube 220.

In the illustrated embodiment, the fluidic system 200 is shown to include a vacuum source 210. As shown, the vacuum source 210 is a vacuum container 208, such as a vacutainer 208. The vacuum container 208 is shaped to removably couple with the filter bracket 206, such as the suction end 226 of the filtration tube 220. As shown, the suction end 226 defines a protrusion 274 shaped and positioned to puncture a portion of the vacuum container 210 to place the vacuum container 210 in fluid communication with the filtration tube 220 when the vacuum container 210 is coupled with the filtration tube 220. In this regard, the vacuum container 210 is configured to draw the fluid sample 202 from the fluid sample cup 208, such as via the cup straw 272, through the filter (not shown, see FIGS. 1A-1D) and into the vacuum container 210 when the fluid sample cup 208 and the vacuum container 210 are coupled to the filtration bracket 206.

In the illustrated embodiment, the filtration unit 204 includes a filter housing 212 cooperatively couplable to the filter bracket 206. As discussed further herein with respect to FIGS. 1A-1D and 4, in an embodiment, the filter housing 212 carries a filter, such as a filter 114 discussed further herein with respect to FIGS. 1A-1D, configured to filter fluid passing through the filter bracket 206. In an embodiment, the filter housing 212 may be coupled and uncoupled from the filter bracket 206 through cooperative coupling structures, such as threads 264A and 264B disposed on each of the filter bracket 206 and the filter housing 212.

As above, the fluidic system 200 includes an assay device 216. In the illustrated embodiment, the assay device 216 is shaped to cooperatively couple with the filter housing 212. As shown, the assay device 216 includes threads 264C shaped to cooperatively couple with corresponding structures disposed on the filter housing 212. The assay device 216 further comprises a porous matrix 218 positioned to be in fluidic communication with the filter when the filter housing 212 is cooperatively coupled with the assay device 216. See for example FIGS. 1A-1D

The assay device 216 is shown to define a sample slot 232 shaped to receive a filter sheath (not shown, see FIGS. 1A-1D) wherein the filter is recessed within the filter sheath of the filtration unit 204. When the filter housing 212 is coupled to the assay device 216, the filter sheath is received by the sample slot 232 such that the filter is placed in fluid communication with the porous matrix 218.

In an embodiment, the porous matrix 218 includes one or more zones for manipulating or processing a fluid sample 202 passed through the porous matrix 218. In an embodiment, the assay device 216 further comprises a buffer reservoir (See FIGS. 1B and 1C) carrying a buffer and is configured to place the buffer in fluid communication with the filter when the filter is cooperatively coupled with the assay device 216. In an embodiment, the assay device 216 further includes a heat source (see FIGS. 1A-1D) configured to heat an amplification portion of the porous matrix 218. As discussed further herein with respect to FIGS. 1A-1D, the amplification portion is configured, when heated, to amplify a target nucleic acid molecule disposed in a fluid sample 202 in the amplification portion.

In an embodiment, the heat source is a heat source activated by contact with a saline solution, such as saline solution 140, and the assay device 216 further comprises a saline solution reservoir, such as saline solution reservoir 144, carrying the saline solution configured to place the saline solution in fluidic communication with the heat source when the filter housing 212 is cooperatively coupled with the assay device 216. Not shown, see FIGS. 1B and 1C.

In an embodiment, the assay device 216 further includes a lysis portion, such as lysis portion 146 discussed further herein with FIGS. 1A-1D, in thermal communication with the heat source, wherein the lysis portion is fluidically isolated from the amplification portion by a phase-change valve, such as phase-change valve 148 discussed further herein with respect to FIGS. 1A-1D; and a detection portion 250 comprising reagents configured to detect a target nucleic acid in the porous matrix 218. As shown, the detection portion 250 is visible from outside of the assay device 216 through a window positioned to expose the detection portion 250 to an outside viewer.

In the illustrated embodiment, the fluidic system 200 is shown to include a detection stand 252 shaped to position a detector, shown here as a cell phone 266, to image the detection portion 250. In this regard, a user can position the assay device 216 within the detection stand 252 a detector to image the detection portion, such as after a fluid sample 202 has been passed through the assay device 216.

In an embodiment, the detection stand 252 is further configured to power the assay device 216, such as through the USB head 260. As discussed further herein, such electrical power can be used to power a heat source to heat various portions of the porous matrix 218.

Methods

In another aspect, the present disclosure provides a method for filtering and analyzing a fluid sample. In that regard, attention is directed to FIGS. 3A-3F, where a method, according to an embodiment of the present disclosure, is illustrated. In an embodiment, the method is an example of using the fluidic apparatus 100 of FIGS. 1A-1C and/or the fluidic system 200 of FIG. 2.

Figure 3A:
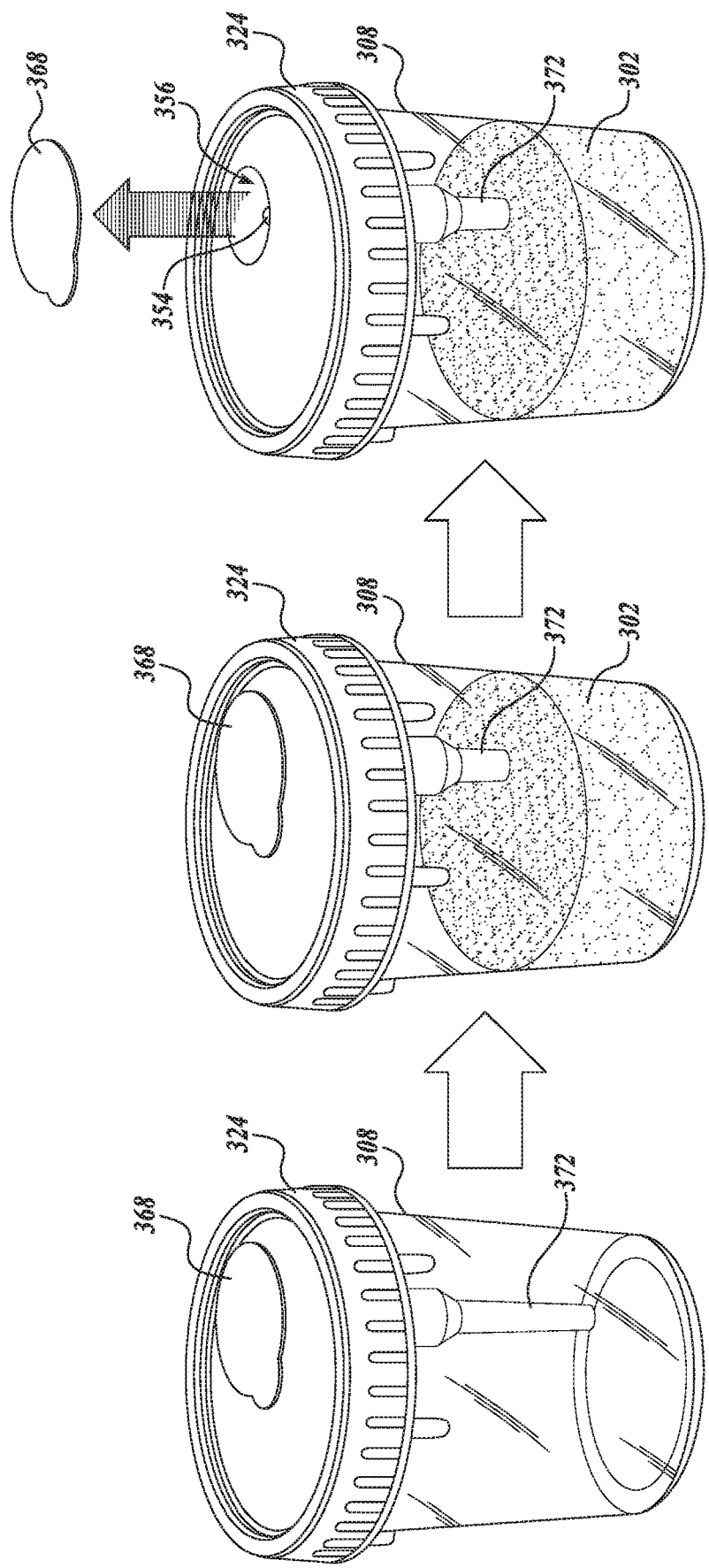
FIG. 3A is a schematic illustration of filling a sample cup and removing a seal therefrom, in accordance with an embodiment of the present disclosure.

FIG. 3A is a schematic illustration of filling a sample cup 308 and removing a seal 368 therefrom. In an embodiment, the fluid sample 302 is a liquid sample, such as a urine sample, such as a urine sample containing or thought to contain a particulate pathogen. As shown, the sample cup 308 includes a cap 324, the cap 324 containing a sample straw 372 shaped to be in fluid contact with a fluid sample 302 disposed in the cup 308. The cap 324 is shown to further define a cap seal 368 shaped to cover a recess 356 and puncturing structure 354 defined by the cap 324. The cap seal 368 is shown to be removed to expose the puncturing structure 354.

Figures 1, 3B:
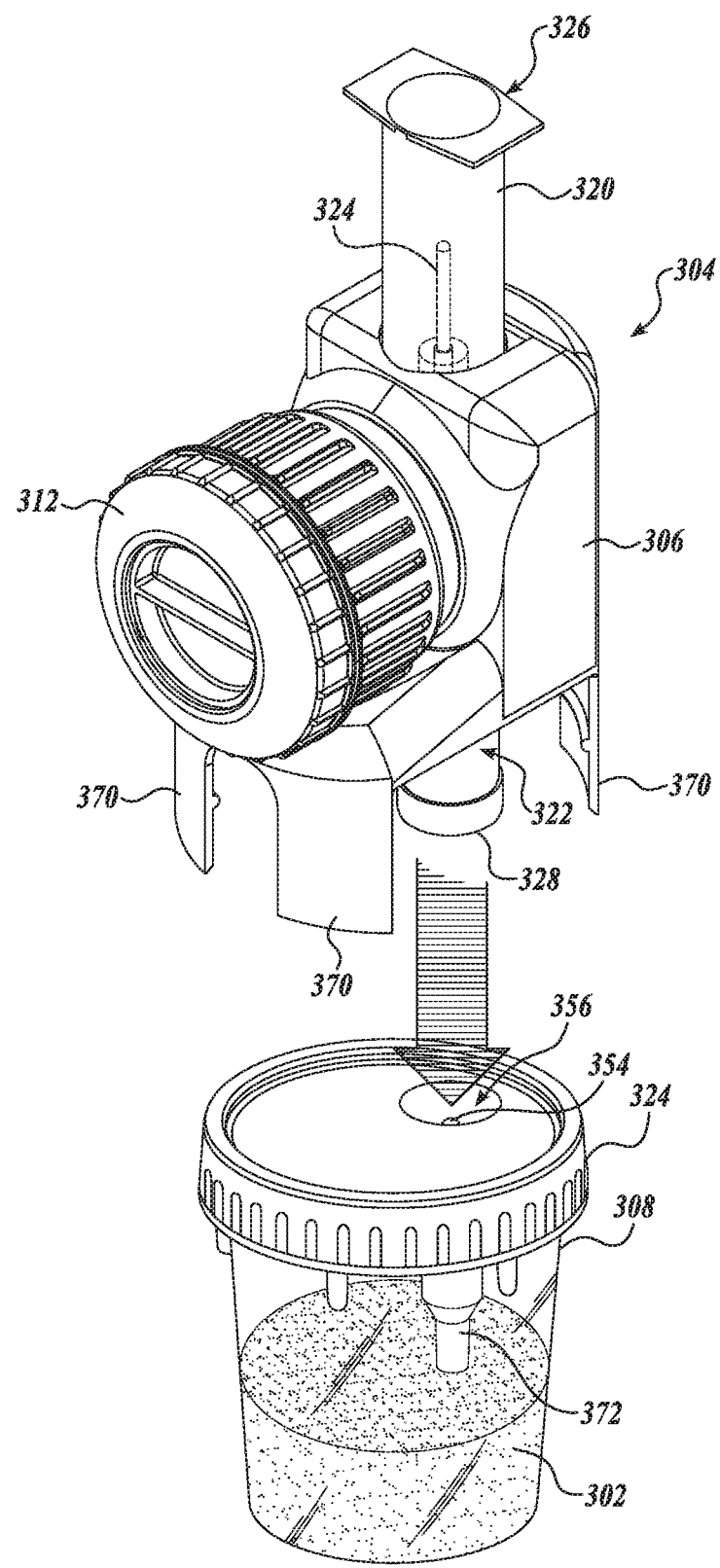
FIG. 3B is a schematic illustration of coupling a filtration unit to the sample cup of FIG. 3A, in accordance with an embodiment of the disclosure.
Figures 2, 3B:
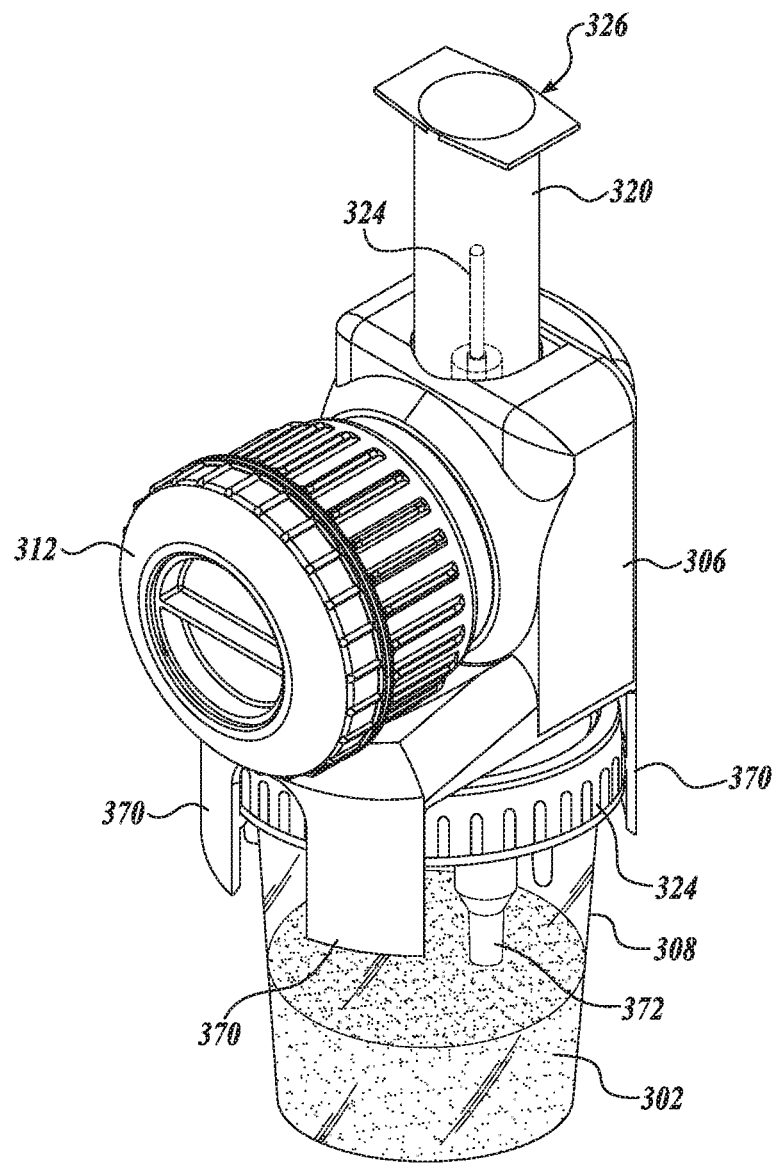

FIG. 3B is a schematic illustration of coupling a filtration unit 304 to the sample cup 308. As a filter bracket 306 of the filtration unit 304 is coupled to the cap 324, flanges 370 of the filter bracket 306 encircle the cap 324 to securely and removably couple the filter bracket 306 to the cup 308. Likewise, a seal 328 disposed on a sampling end 322 of the filtration tube 320 is punctured by the puncturing structure 354. In this regard, the filtration tube 320 is placed in fluid communication with the cup 308 and the fluid sample 302 disposed in the cup 308, such as through the cup straw 372.

Figures 1, 3C:
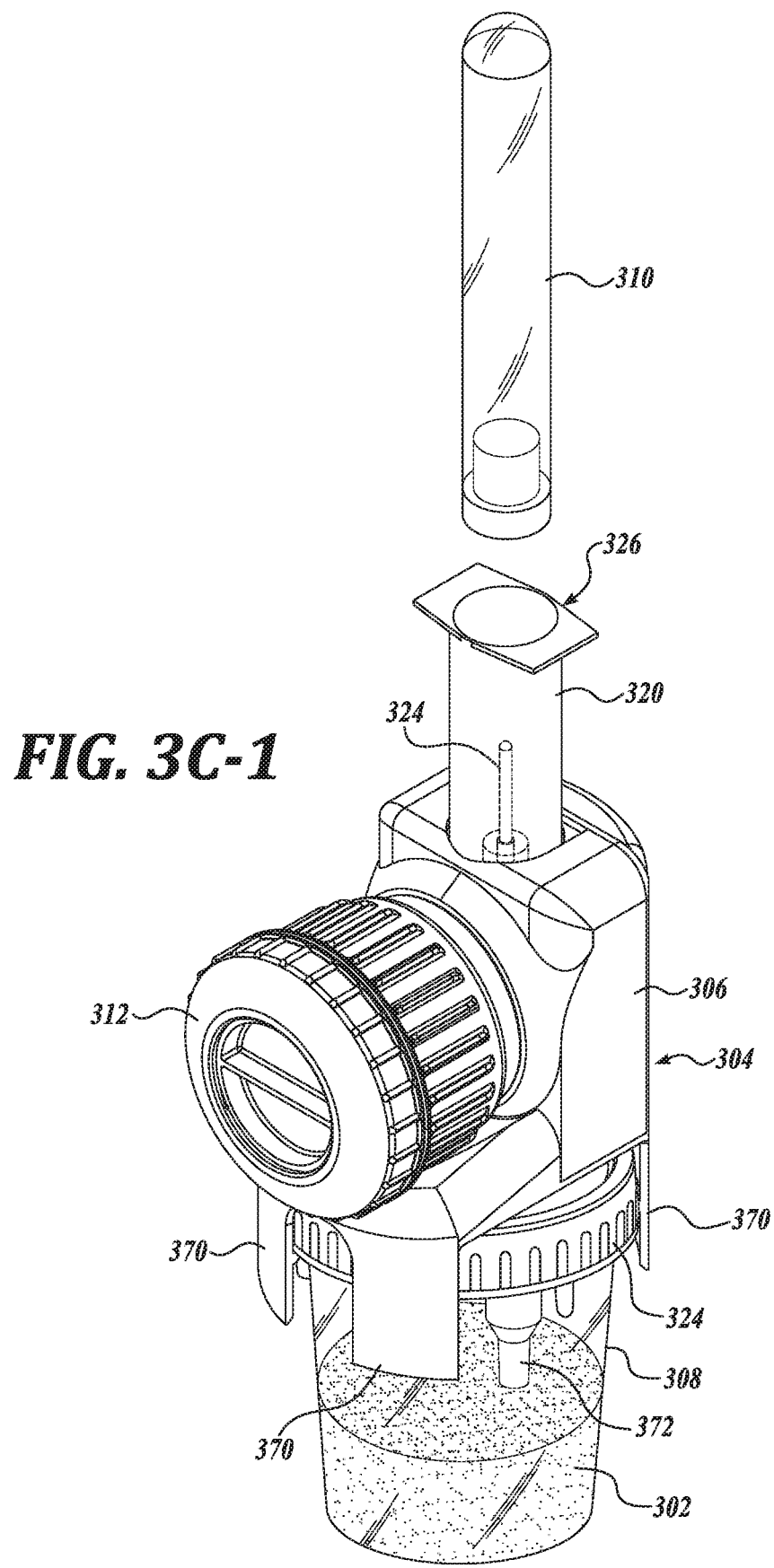
FIG. 3C is a schematic illustration of coupling a vacuum source to the filtration unit of FIG. 3B, in accordance with an embodiment of the present disclosure.
Figures 2, 3C:
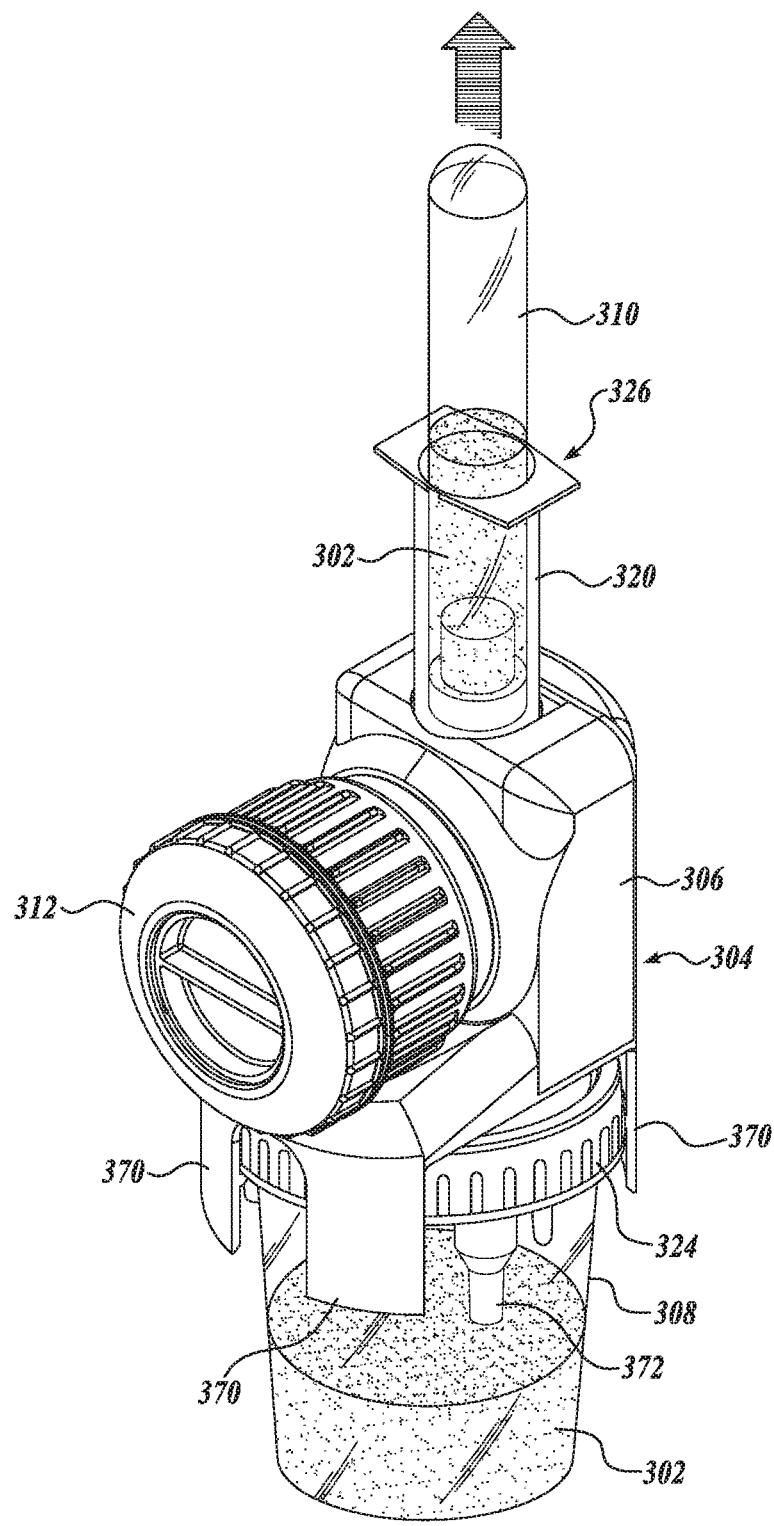

FIG. 3C is a schematic illustration of coupling a vacuum source 310 to the filtration unit 304. As shown, the vacuum source 310 is placed in a suction end 326 of the filtration tube 320 such that a protrusion 374 of the filtration unit 304 punctures the vacuum source 310 to place the filtration tube 320, and accordingly, the contents of the sample cup 308, in fluid communication with the vacuum source 310. In this regard, the fluid sample 302 is passed through the filtration tube 320, thereby filtering at least a portion of the fluid sample 302. An example of filtration of a fluid sample 302 within the filtration unit 304 is schematically illustrated in FIG. 4. As shown, the fluid sample 302 is passed through the filtration tube 320 from the sampling end 322 to the suction end 326 with the filter 314 disposed therebetween.

Figures 1, 3D:
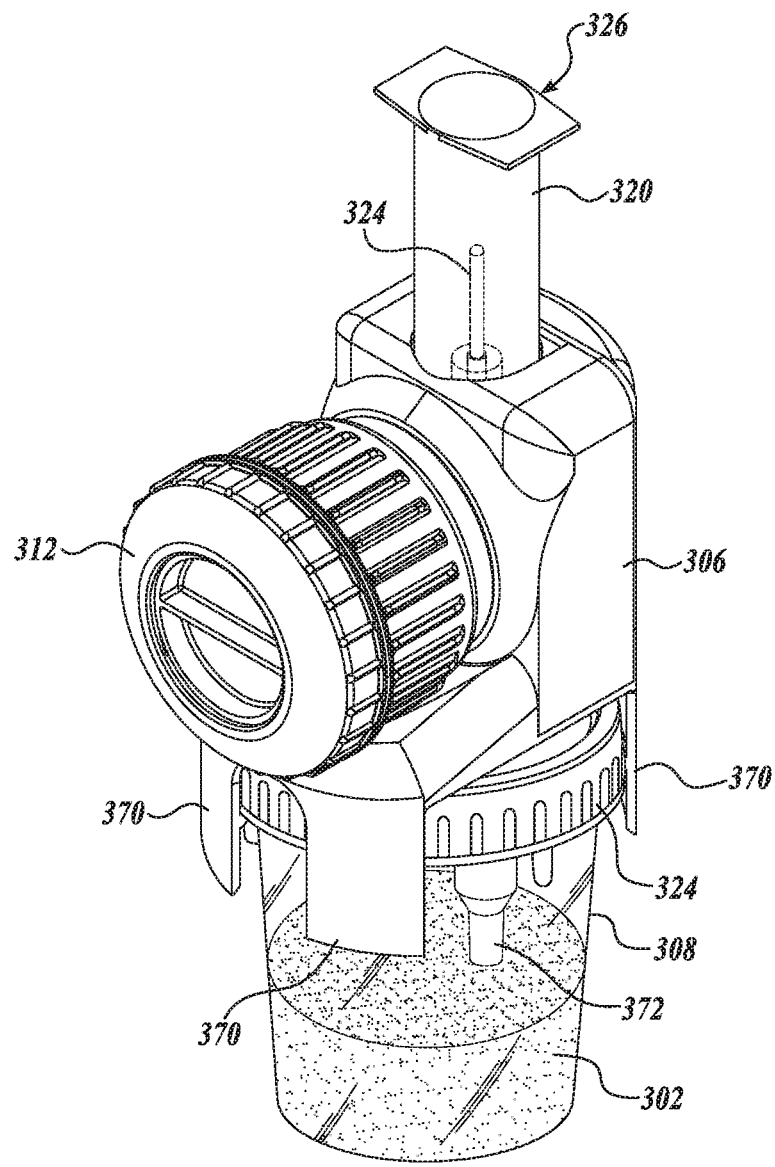
FIG. 3D is a schematic illustration of uncoupling a filter housing from a filtration bracket of the filtration unit of FIG. 3C, in accordance with an embodiment of the present disclosure.
Figures 2, 3D:
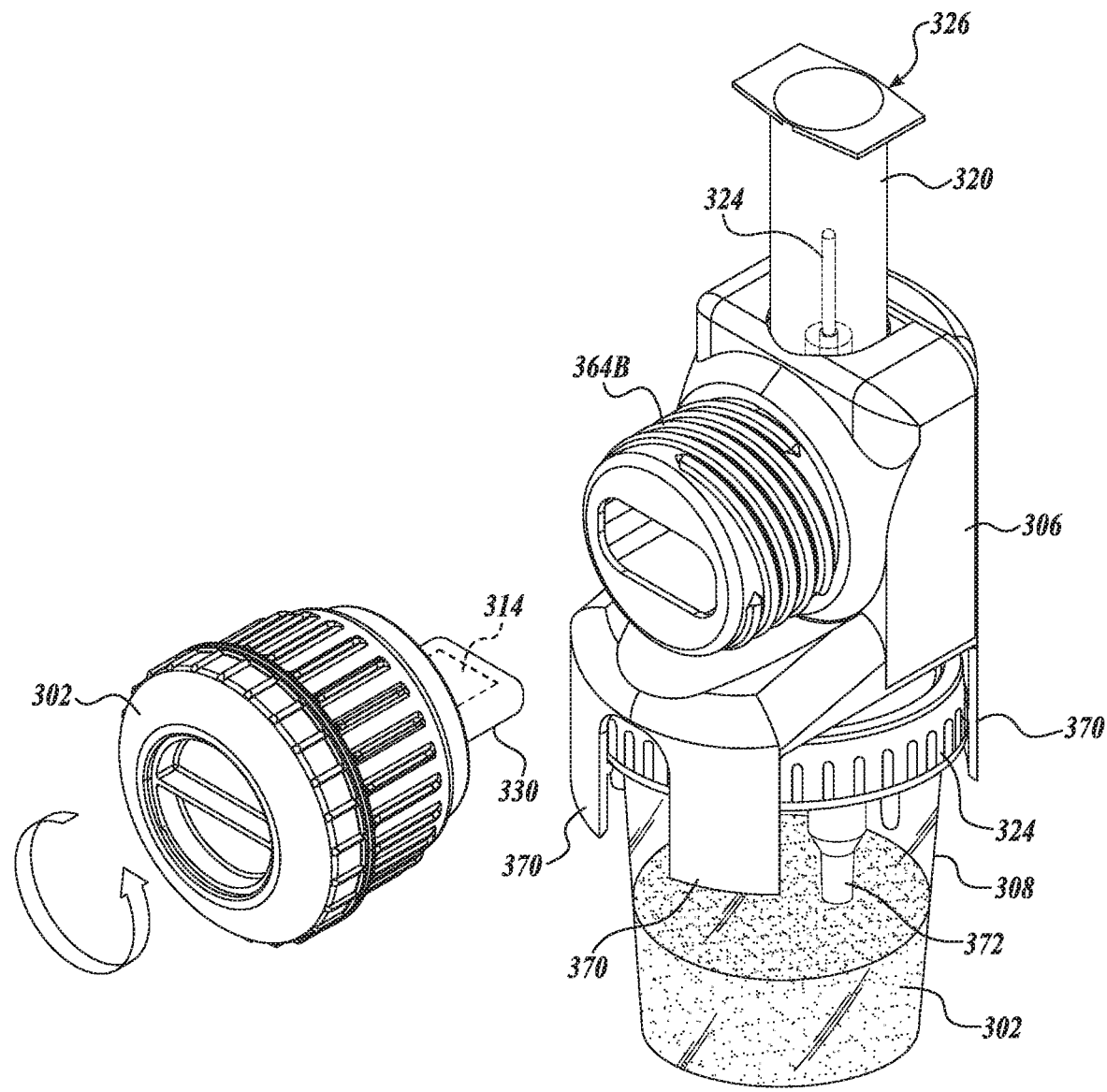

FIG. 3D is a schematic illustration of uncoupling a filter housing 312 from a filtration bracket 306 of the filtration unit 304. Once at least a portion of the fluid sample 302 is filtered in the filtration unit 304, a filter housing 312 is uncoupled from the filter bracket 306. As shown, the filter housing 312 includes a filter sheath 330 housing a filter 314 disposed therein. The filter 314 is partially encased within the filter sheath 330 to protect the filter 314 from contamination and a user from contacting the filter 314. In the illustrated embodiment, the filter housing 312 and the filter bracket 306 are cooperatively coupled through threads 364A and 364B. While threads are discussed herein, it will be understood that other cooperative coupling structures are possible and within the scope of the present disclosure.

Figures 1, 3E:
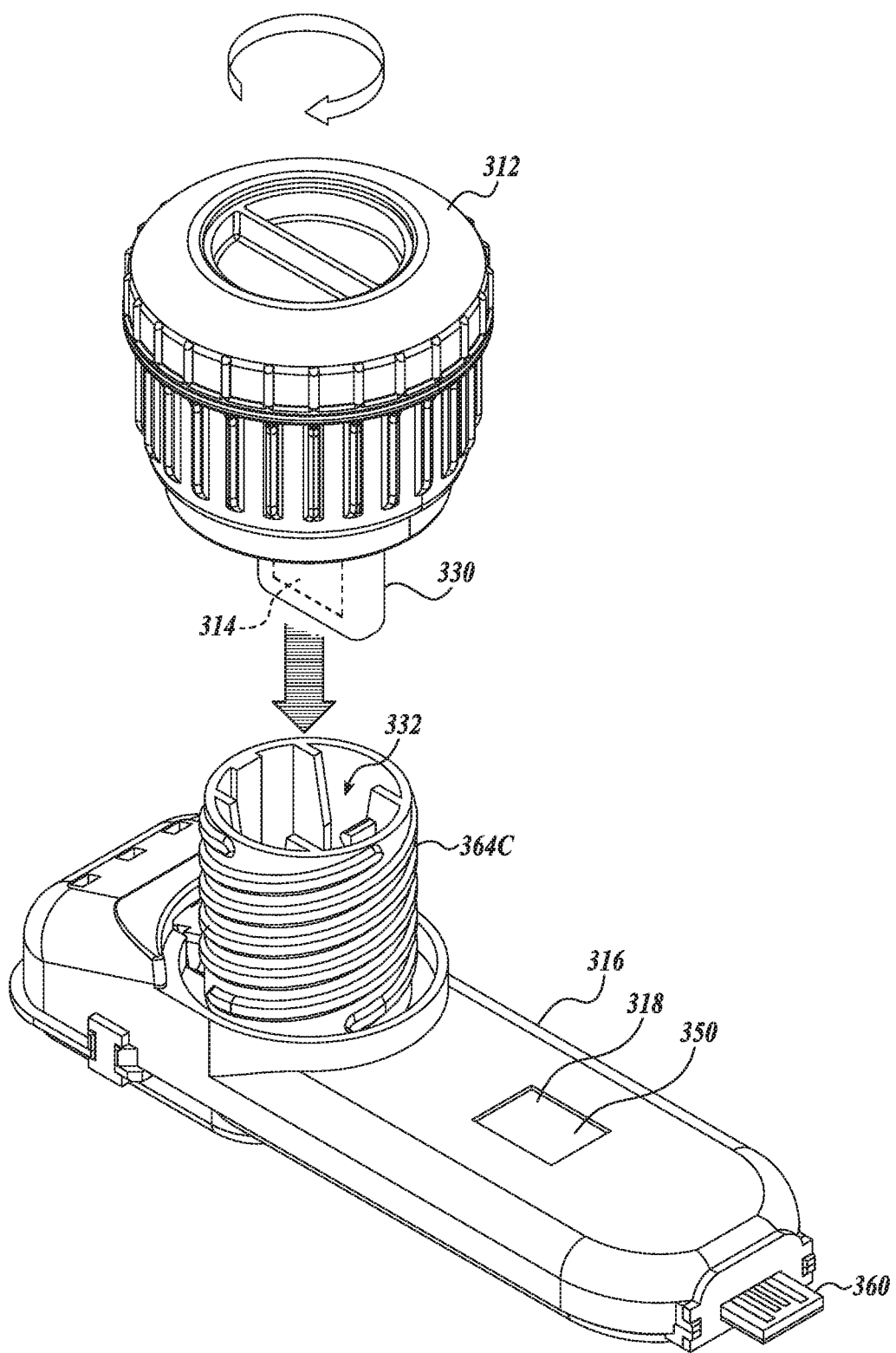
FIG. 3E is a schematic illustration of coupling the filter housing of FIG. 3D to an assay device, in accordance with an embodiment of the present disclosure.
Figures 2, 3E:
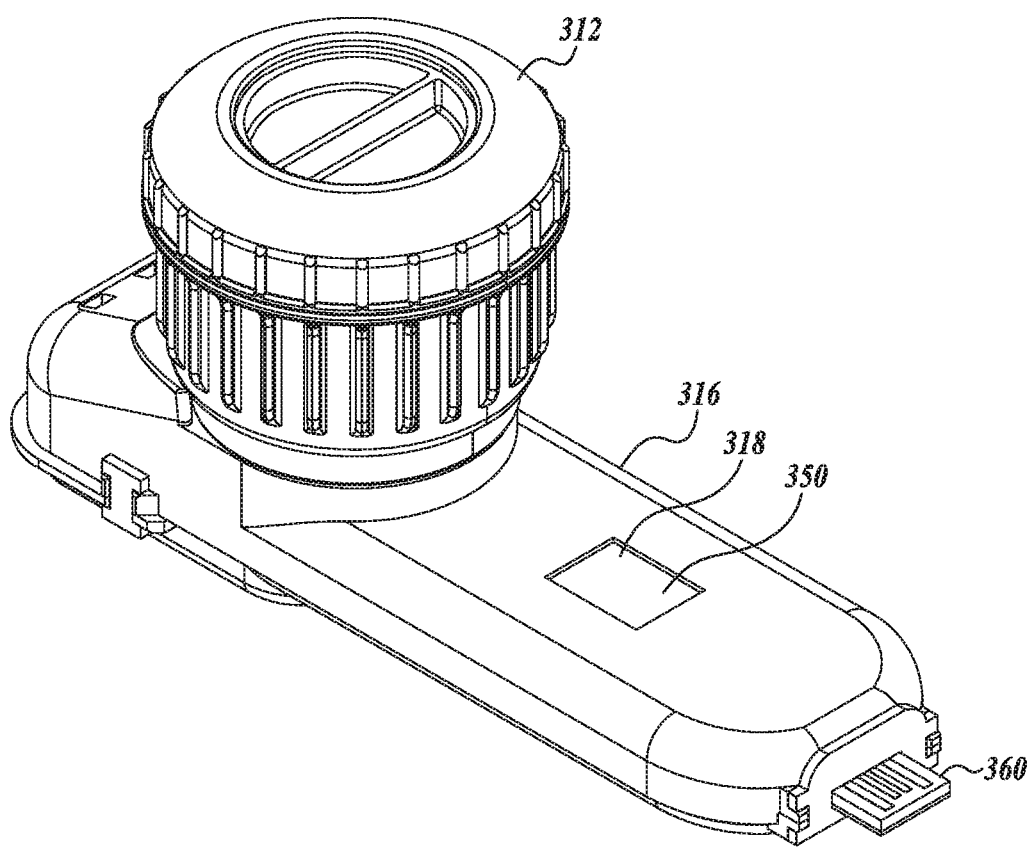

FIG. 3E is a schematic illustration of coupling the filter housing 312 of FIG. 3D to an assay device 316. In an embodiment, the assay device 316 is an example of assay device 116 of FIGS. 1A-1C and/or assay device 216 of FIG. 2. In the illustrated embodiment, the filter housing 312 is cooperatively coupled to the assay device 316 with threads 364A and 364C disposed on the filter housing 312 and assay device 316 respectively. In this regard, filter housing 312 is rotated relative to the assay device 316 such that filter sheath 330 is accepted by the sample slot 332.

In an embodiment, coupling the filter housing 312 to the assay device 316 activates one or more activities within the assay device 316. For example, in an embodiment, coupling the filter housing 312 to the assay device 316 rotates a pivot to puncture a buffer reservoir (see FIGS. 1B and 1C) carrying a buffer, which places the buffer in fluid communication with the filter 314 and the porous matrix 318. In this regard, a filtered sample 302 flows from the filter 314 to the porous matrix 318 for further manipulation and analysis. In an embodiment, coupling the filter 314 to the assay device 316 further places a saline solution in fluidic communication with a heat source (see FIGS. 1A-1D), thereby activating the heat source and heating a portion of the porous matrix 318 in thermal communication with the heat source, such as a lysis portion of the porous matrix 318.

FIG. 3F schematically illustrates coupling the assay device 316 to a detection stand 352. As shown, the detection stand 352 defines a recess shaped to receive the assay device 316. In the illustrated embodiment, the assay device 316 includes a USB head 360 configured to receive power. In an embodiment, the detection stand 352 or cell phone 366 coupled thereto is configured to provide electrical power to the assay device 316, such as through the USB head 360. In an embodiment, such electrical power is configured to generate heat in a heat source of the assay device 316. While a detection stand In an embodiment, heating the porous matrix 318 performs one or more of the following functions: deactivating enzymes, bursting cells, and extracting nucleic acids of the liquid biological sample 302 in a sample processing portion of the porous matrix 318 and into the buffer; melting a phase-change valve disposed between the sample processing portion and an amplification portion of the porous matrix 318 to place the sample processing portion and the amplification portion in fluidic communication; and amplifying any target nucleic acids in the liquid biological sample 302 in the amplification portion.

In an embodiment, the method includes generating a signal with a detector, shown here as a cell phone 366, based upon the detection portion 350 of the assay device 316. Such a signal can be based upon a change in color of the detection portion 350, fluorescence emitted from the detection portion 350, and the like, indicative of a presence or absence of a target analyte, such as a target nucleic acid molecule in the detection portion 350. In an embodiment, the cell phone 366 includes logic that, when executed by the cell phone 366, causes the phone to send the signal to one or more health care providers. In an embodiment, the cell phone 366 includes logic that, when executed by the cell phone 366, causes the phone to generate an image or other visual signal indicating a result of the assay based on the signal.

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only

EXAMPLE

*Neisseria gonorrhoeae* cells were grown on chocolate agar plates (Cat #B21169X, Fisher scientific) overnight at 37° C. in a 5% $CO_2$ atmosphere. After 24-48 hours incubation, cells were scraped from the plate and resuspended in sterile, molecular grade 1X DPBS (Cat #D8537-500ML, MilliporeSigma). Cells were further diluted in DPBS before being subject to one of three sample preparation methods. The "silica column" or "kit" method was that of the Gen-Elute Bacterial Genomic DNA Kit (Cat #NA2110, MilliporeSigma). A different aliquot of the same cell dilution was subjected to either a lab-developed capillary-driven device, or the vacutainer device described in this work. Bacteria-laden filters from either the capillary or vacutainer device were input into a microfuge tube containing a known volume of 10 mM Tris pH 8.0 buffer. The microfuge tube containing the submerged filter was placed into a 95° C. heat block for >5 minutes. Filters were removed and the remaining eluate was evaluated for concentration of *N. gonorrhoeae* genomic DNA using qPCR (Cat #BIO-86005, Meridian Bioscience, Memphis, Tenn., USA). Primers and probe used were that of Hjelmevoll et al., 2006 (doi: 10.2353/jmoldx.2006.060024). DNA concentration was calculated against a standard curve of known values and adjusted for dilution factors before being normalized to the DNA concentration yield measured from the silica column/kit method.

Figure 5:
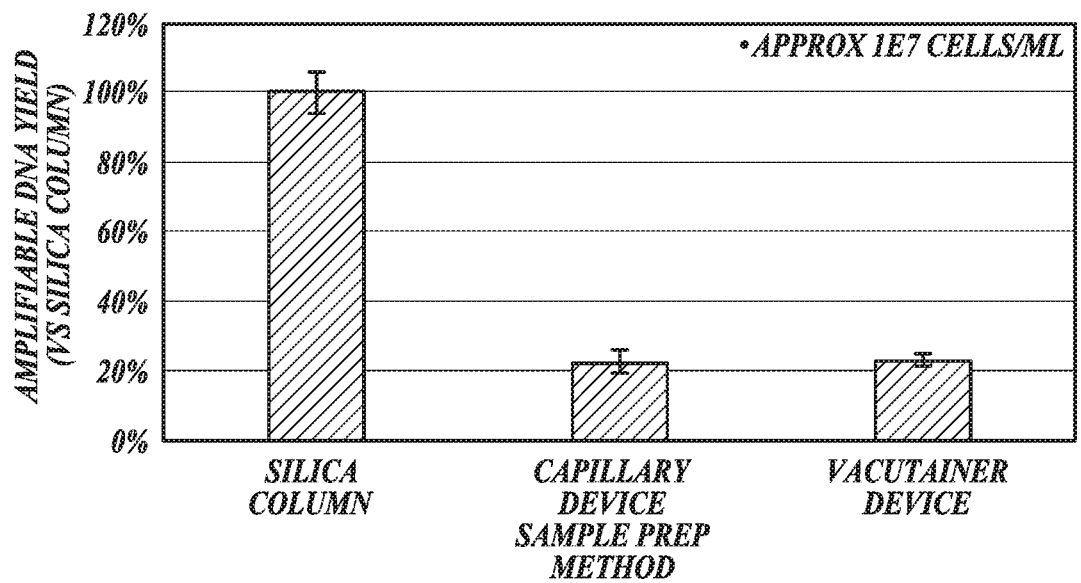
FIG. 5 graphically illustrates DNA yield from *Neisseria gonorrhoeae* using conventional techniques and a fluidic system, according to an embodiment of the disclosure.
Figure 6:
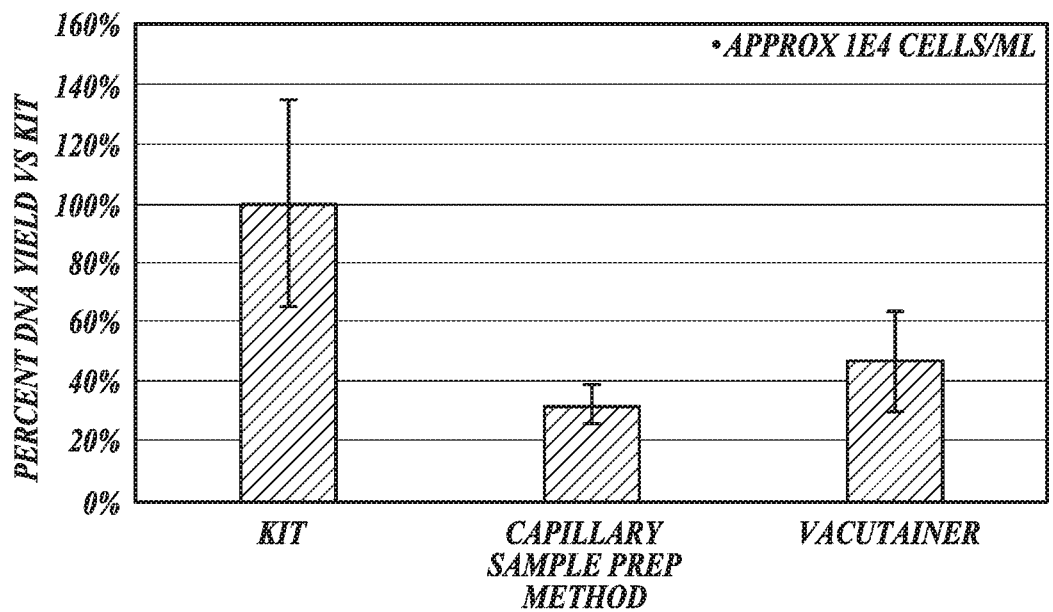
FIG. 6 graphically illustrates DNA recovery of low-concentration *Neisseria gonorrhoeae* using conventional techniques and a fluidic system, according to an embodiment of the disclosure.

DNA yields and low-concentration recovery of these assays are graphically illustrated in FIGS. 5 and 6, respectively. As shown, the systems and methods of the present disclosure perform as well or better than the conventional lab-developed, capillary-driven sample prep device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

The invention claimed is:

1. A fluidic apparatus for filtering and assaying a fluid sample, the apparatus comprising:
    a filtration unit comprising:
        a filter bracket shaped to removably couple with a fluid sample cup and a vacuum container; and
        a filter housing cooperatively couplable to the filter bracket and comprising a filter configured to filter fluid passing through the filter bracket; and
    an assay device shaped to cooperatively couple with the filter housing and comprising a porous matrix positioned to be in fluidic communication with the filter when the filter housing is cooperatively coupled with the assay device,
    wherein the filter bracket defines a filtration tube comprising:
        a sampling end shaped and positioned to couple with a cap of the fluid sample cup: and
        a suction end positioned opposite the sampling end and shaped to couple with the vacuum container.

2. The fluidic apparatus of claim 1, wherein the sampling end of the filtration tube comprises a vacuum seal shaped and positioned to be broken by the cap of the fluid sample cup when the filter bracket is coupled to the fluid sample cup.

3. The fluidic apparatus of claim 1, wherein the filter is recessed within a filter sheath of the filter housing, and wherein the assay device comprises a sample slot shaped to receive the filter sheath.

4. The fluidic apparatus of claim 1, wherein the assay device further comprises a buffer reservoir carrying a buffer and is configured to place the buffer in fluid communication with the filter when the filter housing is cooperatively coupled with the assay device.

5. The fluidic apparatus of claim 1, wherein the assay device further comprises:
    a heat source activated by contact with a saline solution and configured to heat an amplification portion of the porous matrix; and
    a saline solution reservoir carrying a saline solution configured to place the saline solution in fluidic communication with the heat source when the filter is cooperatively coupled with the assay device.

6. The fluidic apparatus of claim 5, wherein the amplification portion comprises amplification reagents configured to amplify a target nucleic acid in or thought to be in a sample filtered by the filter.

7. The fluidic apparatus of claim 5, wherein the porous matrix further comprises a lysis portion in thermal communication with the heat source, wherein the lysis portion is fluidically isolated from the amplification portion by a phase-change valve.

8. The fluidic apparatus of claim 1, wherein the porous matrix further comprises a detection portion comprising detection reagents configured to detect a target nucleic acid in the porous matrix.

9. A fluidic apparatus for filtering and assaying a fluid sample, the apparatus comprising:
   a filtration unit comprising:
      a filter bracket shaped to removably couple with a fluid sample cup and a vacuum container; and
      a filter housing cooperatively couplable to the filter bracket and comprising a filter configured to filter fluid passing through the filter bracket; and
   an assay device shaped to cooperatively couple with the filter housing and comprising a porous matrix positioned to be in fluidic communication with the filter when the filter housing is cooperatively coupled with the assay device,
   wherein the filter is recessed within a filter sheath of the filter housing, and wherein the assay device comprises a sample slot shaped to receive the filter sheath.

10. The fluidic apparatus of claim 9, wherein the filter bracket defines a filtration tube comprising:
   a sampling end shaped and positioned to couple with a cap of the fluid sample cup; and
   a suction end positioned opposite the sampling end and shaped to couple with the vacuum container.

11. The fluidic apparatus of claim 10, wherein the sampling end of the filtration tube comprises a vacuum seal shaped and positioned to be broken by the cap of the fluid sample cup when the filter bracket is coupled to the fluid sample cup.

12. The fluidic apparatus of claim 9, wherein the assay device further comprises a buffer reservoir carrying a buffer and is configured to place the buffer in fluid communication with the filter when the filter housing is cooperatively coupled with the assay device.

13. The fluidic apparatus of claim 9, wherein the assay device further comprises:
   a heat source activated by contact with a saline solution and configured to heat an amplification portion of the porous matrix; and
   a saline solution reservoir carrying a saline solution configured to place the saline solution in fluidic communication with the heat source when the filter is cooperatively coupled with the assay device.

14. The fluidic apparatus of claim 13, wherein the amplification portion comprises amplification reagents configured to amplify a target nucleic acid in or thought to be in a sample filtered by the filter.

15. The fluidic apparatus of claim 13, wherein the porous matrix further comprises a lysis portion in thermal communication with the heat source, wherein the lysis portion is fluidically isolated from the amplification portion by a phase-change valve.

16. The fluidic apparatus of claim 9, wherein the porous matrix further comprises a detection portion comprising detection reagents configured to detect a target nucleic acid in the porous matrix.

17. A fluidic apparatus for filtering and assaying a fluid sample, the apparatus comprising:
   a filtration unit comprising:
      a filter bracket shaped to removably couple with a fluid sample cup and a vacuum container; and
      a filter housing cooperatively couplable to the filter bracket and comprising a filter configured to filter fluid passing through the filter bracket; and
   an assay device shaped to cooperatively couple with the filter housing and comprising:
      a porous matrix positioned to be in fluidic communication with the filter when the filter housing is cooperatively coupled with the assay device; and
      a buffer reservoir carrying a buffer and is configured to place the buffer in fluid communication with the filter when the filter housing is cooperatively coupled with the assay device.

18. The fluidic apparatus of claim 17, wherein the filter bracket defines a filtration tube comprising:
   a sampling end shaped and positioned to couple with a cap of the fluid sample cup; and
   a suction end positioned opposite the sampling end and shaped to couple with the vacuum container.

19. The fluidic apparatus of claim 18, wherein the sampling end of the filtration tube comprises a vacuum seal shaped and positioned to be broken by the cap of the fluid sample cup when the filter bracket is coupled to the fluid sample cup.

20. The fluidic apparatus of claim 17, wherein the filter is recessed within a filter sheath of the filter housing, and wherein the assay device comprises a sample slot shaped to receive the filter sheath.

21. The fluidic apparatus of claim 17, wherein the assay device further comprises:
   a heat source activated by contact with a saline solution and configured to heat an amplification portion of the porous matrix; and
   a saline solution reservoir carrying a saline solution configured to place the saline solution in fluidic communication with the heat source when the filter is cooperatively coupled with the assay device.

22. The fluidic apparatus of claim 21, wherein the amplification portion comprises amplification reagents configured to amplify a target nucleic acid in or thought to be in a sample filtered by the filter.

23. The fluidic apparatus of claim 21, wherein the porous matrix further comprises a lysis portion in thermal communication with the heat source, wherein the lysis portion is fluidically isolated from the amplification portion by a phase-change valve.

24. The fluidic apparatus of claim 17, wherein the porous matrix further comprises a detection portion comprising detection reagents configured to detect a target nucleic acid in the porous matrix.

25. A fluidic apparatus for filtering and assaying a fluid sample, the apparatus comprising:
   a filtration unit comprising:
      a filter bracket shaped to removably couple with a fluid sample cup and a vacuum container; and
      a filter housing cooperatively couplable to the filter bracket and comprising a filter configured to filter fluid passing through the filter bracket; and
   an assay device shaped to cooperatively couple with the filter housing and comprising:
      a porous matrix positioned to be in fluidic communication with the filter when the filter housing is cooperatively coupled with the assay device;
      a heat source activated by contact with a saline solution and configured to heat an amplification portion of the porous matrix; and
      a saline solution reservoir carrying a saline solution configured to place the saline solution in fluidic communication with the heat source when the filter is cooperatively coupled with the assay device.

26. The fluidic apparatus of claim 25, wherein the filter bracket defines a filtration tube comprising:
   a sampling end shaped and positioned to couple with a cap of the fluid sample cup; and
   a suction end positioned opposite the sampling end and shaped to couple with the vacuum container.

27. The fluidic apparatus of claim 26, wherein the sampling end of the filtration tube comprises a vacuum seal shaped and positioned to be broken by the cap of the fluid sample cup when the filter bracket is coupled to the fluid sample cup.

28. The fluidic apparatus of claim 25, wherein the filter is recessed within a filter sheath of the filter housing, and wherein the assay device comprises a sample slot shaped to receive the filter sheath.

29. The fluidic apparatus of claim 25, wherein the assay device further comprises a buffer reservoir carrying a buffer and is configured to place the buffer in fluid communication with the filter when the filter housing is cooperatively coupled with the assay device.

30. The fluidic apparatus of claim 25, wherein the amplification portion comprises amplification reagents configured to amplify a target nucleic acid in or thought to be in a sample filtered by the filter.

31. The fluidic apparatus of claim 25, wherein the porous matrix further comprises a lysis portion in thermal communication with the heat source, wherein the lysis portion is fluidically isolated from the amplification portion by a phase-change valve.

32. The fluidic apparatus of claim 25, wherein the porous matrix further comprises a detection portion comprising detection reagents configured to detect a target nucleic acid in the porous matrix.

* * * * *